US008181038B2

(12) United States Patent
Chang

(10) Patent No.: US 8,181,038 B2
(45) Date of Patent: May 15, 2012

(54) SYSTEMS AND METHODS FOR EXECUTING ENCRYPTED PROGRAMS

(75) Inventor: Chih-Chung Chang, Taipei (TW)

(73) Assignee: Cyberlink Corp., Shindian, Taipei (TW)

( * ) Notice: Subject to any disclaimer, the term of this patent is extended or adjusted under 35 U.S.C. 154(b) by 1259 days.

(21) Appl. No.: 11/733,842

(22) Filed: Apr. 11, 2007

(65) Prior Publication Data
US 2008/0253563 A1 Oct. 16, 2008

(51) Int. Cl.
*G06F 21/00* (2006.01)
(52) U.S. Cl. .......................................... 713/192; 380/200
(58) Field of Classification Search .................. None
See application file for complete search history.

(56) References Cited

U.S. PATENT DOCUMENTS

| | | | | |
|---|---|---|---|---|
| 4,634,807 A * | 1/1987 | Chorley et al. | ................. | 705/55 |
| 5,146,575 A * | 9/1992 | Nolan, Jr. | ...................... | 711/164 |
| 5,757,919 A | 5/1998 | Herbert et al. | | |
| 2002/0113828 A1* | 8/2002 | Kawakita | ...................... | 345/867 |
| 2003/0007643 A1* | 1/2003 | Ben-Zur et al. | ............... | 380/277 |
| 2005/0021941 A1* | 1/2005 | Ohmori et al. | ................ | 713/156 |
| 2005/0027994 A1* | 2/2005 | Sai | ................................ | 713/189 |
| 2005/0071656 A1* | 3/2005 | Klein et al. | .................... | 713/193 |
| 2005/0144634 A1* | 6/2005 | Koo et al. | ......................... | 725/31 |
| 2006/0047976 A1* | 3/2006 | Moroney et al. | ............. | 713/193 |
| 2006/0161984 A1* | 7/2006 | Phillips et al. | ................. | 726/24 |
| 2006/0177068 A1* | 8/2006 | Hatakeyama | ................. | 380/282 |
| 2007/0074241 A1* | 3/2007 | Yeo | ................................. | 725/31 |
| 2007/0100771 A1* | 5/2007 | Eckleder et al. | ............... | 705/67 |
| 2007/0110408 A1* | 5/2007 | Chang et al. | ................... | 386/126 |
| 2007/0113079 A1* | 5/2007 | Ito et al. | ........................ | 713/166 |
| 2007/0126555 A1* | 6/2007 | Bandy | ........................... | 340/10.2 |
| 2007/0150078 A1* | 6/2007 | Tanabe et al. | ................... | 700/33 |
| 2007/0162964 A1* | 7/2007 | Wang et al. | ....................... | 726/5 |
| 2008/0065547 A1* | 3/2008 | Shimizu | .......................... | 705/51 |

FOREIGN PATENT DOCUMENTS

| | | |
|---|---|---|
| JP | 2001-508893 | 7/2001 |
| JP | 2003-8567 | 1/2003 |
| JP | 2003-520355 | 7/2003 |
| JP | 2003-256061 | 9/2003 |
| JP | 2003-333316 | 11/2003 |
| JP | 2006-146683 | 6/2006 |
| JP | 2006-209691 | 8/2006 |
| WO | 0152234 A1 | 7/2001 |

OTHER PUBLICATIONS

Japanese Office Action dated Nov. 16, 2010.
English translation of abstract of JP 2006-209691.
English translation of abstract of JP 2006-146683.
English translation of abstract of JP 2001-508893.
English translation of abstract of JP 2003-333316.
English translation of abstract of JP 2003-8567.
English translation of abstract of JP 2003-256061.
English translation of abstract of JP 2003-520355.

* cited by examiner

*Primary Examiner* — David Pearson
(74) *Attorney, Agent, or Firm* — Thomas, Kayden, Horstemeyer & Risley, LLP

(57) ABSTRACT

Systems and methods for secure program execution are described. At least one embodiment includes a system for securely executing software comprising a host configured to accept a disc containing encrypted content to be accessed and store an encrypted program used to access the content on the disc. The system further comprises a secure coprocessor communicatively coupled to the host and configured to receive the encrypted program, decrypt and execute the encrypted program, and communicate an output generated by the program back to the host.

17 Claims, 7 Drawing Sheets

SYSTEMS AND METHODS FOR EXECUTING ENCRYPTED PROGRAMS

TECHNICAL FIELD

The present disclosure generally relates to processing encrypted data.

BACKGROUND

Over the years, digital video content has gained increasing popularity with consumers. With the increasing amount of audio and video content available to consumers through broadcast, cable, on-demand, fixed media, and other available sources of multimedia content, consumers have easy access to an increasing amount of content and programming. Furthermore, many devices (e.g., PCs, DVD recorders) and services that are readily available allow consumers to record, time-shift or view on-demand video and audio content. Furthermore, an increasing amount of video content is becoming available over the Internet and other data services in the form of downloadable content such as IPTV (Internet Protocol Television) delivered video services.

Generally, video content can be stored in any number of common formats such as MPEG-1, MPEG-2, or DV (digital video), for example. Likewise, audio content may be stored in any number of common digital formats such as MP3, WAV, or MPEG Audio, for example. The availability of multimedia content in a vast array of digital formats has helped make distribution of multimedia content easier because of the high degree of portability.

Video playback systems are well known, and there are a variety of current standards that govern the format and other attributes associated with the various video playback systems. Today, the DVD (Digital Video Disc) standard is the predominant format utilized for optical disc storage because of its high storage capacity, thus enabling high quality video and audio to be stored. Consequently, media content such as movies, television shows, and music videos are made widely available in DVD format.

Currently, there are various standards in consideration to become the successor to the DVD standard. Two formats competing to become the next generation optical standard are Blu-ray Disc and HD DVD (High Definition Digital Video Disc). As with other newer standards, Blu-ray Disc offers advantages over DVDs and other previous optical standards in various ways including increased storage capacity and enhanced interactivity (disc content authoring, seamless menu navigation, network/Internet connectivity, etc.). The Blu-ray Disc framework offers content providers almost unlimited functionality when creating interactive titles. The author has complete freedom in designing the user interface, which is controllable by using standard navigational buttons on a remote control. These newer-generation video standards such as Blu-ray Disc and HD DVD are providing greater levels of user control and interactivity with the underlying video content.

Unfortunately, piracy of audio/visual works has also proliferated over the years as technology continues to facilitate the distribution of multimedia content. Because of the capability in accessing and copying multimedia content stored on DVDs, for example, video and audio piracy continues to be an ongoing problem. Such piracy continues to be a problem even in light of the copy-restricted mechanisms that DVDs generally employ. Furthermore, with the newer standards such as HD DVD and Blu-ray Disc that offer increased interactive features, video and audio piracy will likely be an ongoing problem.

In response to unauthorized copying and distribution of multimedia content, publishers and authors of audio/visual works have relied on technologies that control access to digital content. The term Digital Rights Management (DRM) generally describes technologies used to achieve restricted access to multimedia content. Such DRM technologies are based on a large variety of technologies, including multimedia player software that control access to content using encryption. However, one apparent shortcoming of using software applications to control access to encrypted content is that such software can be accessed and reversed-engineered in many cases. Even with the existence of protection mechanisms on DVDs, users have discovered ways to circumvent these protection mechanisms. One way is by modifying commercial DVD playback software whereby decrypted and decoded multimedia streams are written directly to the hard disk on a computer.

Given that personal computers generally operate in an open environment, it can be a challenge to protect such applications as DVD playback software. In some instances, software code can be dissected and analyzed, thereby exposing sensitive data embedded within the program. This can prove to be very costly as such data as decryption keys used for distributing content incorporating DRM may be obtained and reused. With the proper tools, it is possible to examine blocks of memory holding these keys to gain unauthorized access to protected content. Thus, conventional approaches involving software applications stored in open memory suffer from various apparent shortcomings.

SUMMARY

Systems and methods for secure program execution are described. At least one embodiment includes a system for securely executing software comprising a host configured to accept a disc containing encrypted content to be accessed and store an encrypted program used to access the content on the disc. The system further comprises a secure coprocessor communicatively coupled to the host and configured to receive the encrypted program, decrypt and execute the encrypted program, and communicate an output generated by the program back to the host.

Another embodiment includes a method for executing encrypted software comprising: receiving an encrypted program from a host configured to store the encrypted program, wherein the host is further configured to receive a disc storing encrypted content; receiving information contained on the disc; decrypting the encrypted program on a secure coprocessor via a processing unit; storing the decrypted program into a restricted access RAM, wherein the restricted access RAM is coupled to the processing unit and is accessible only by the processing unit; executing the decrypted program stored in the restricted access RAM to generate an output; and transmitting the output to the host.

Yet another embodiment includes a computer readable medium having a computer program stored thereon for performing the computer executable method of: transmitting an encrypted program from a host configured to store the encrypted program, wherein the host is further configured to receive a disc storing encrypted content; transmitting content contained on the disc; decrypting the encrypted program via a processing unit; storing the decrypted program into a restricted access RAM, wherein the restricted access RAM is coupled to the processing unit and is accessible only by the processing unit; executing the decrypted program stored in the restricted access RAM to generate an output; and communicating the output to the host.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
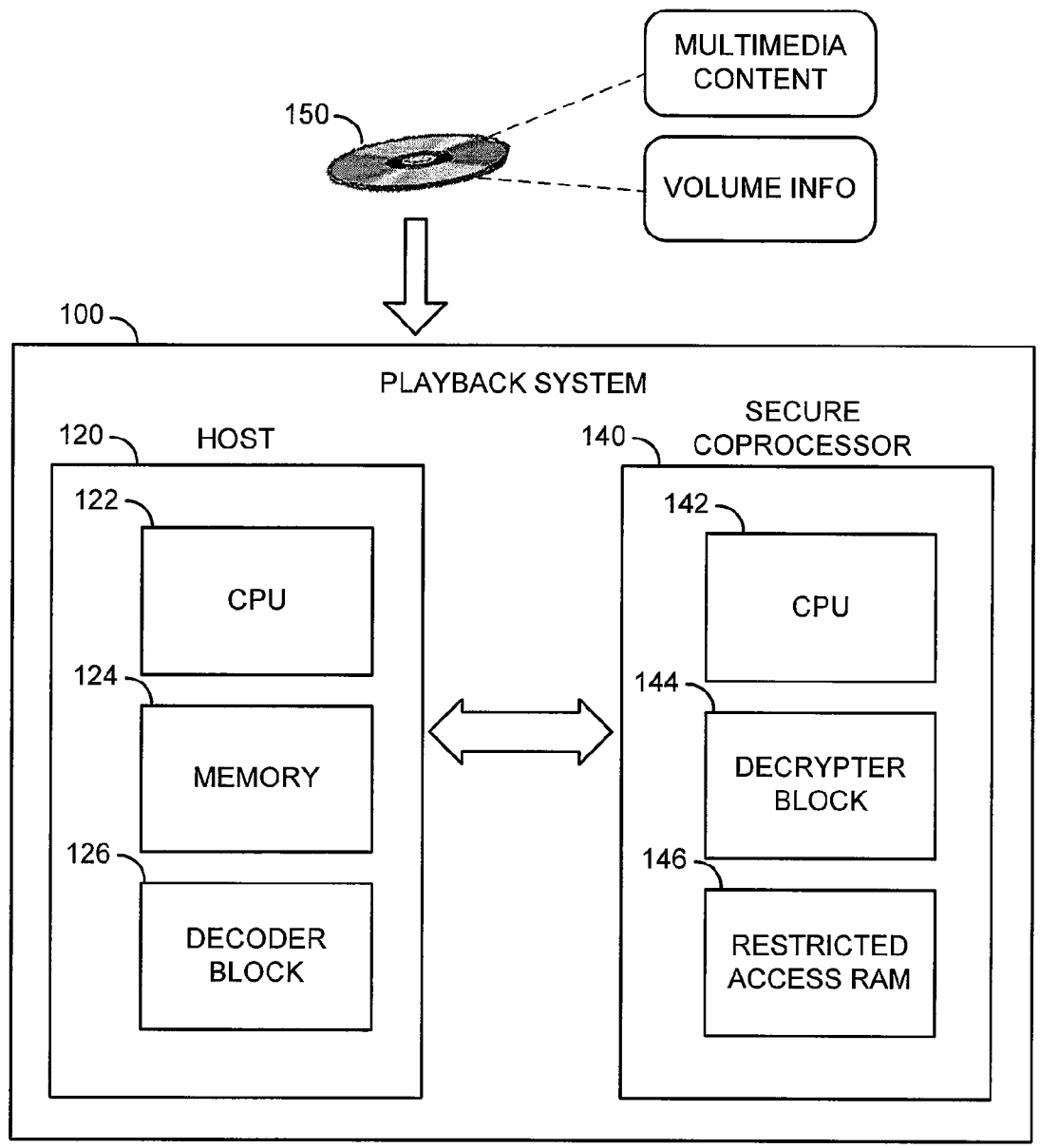
FIG. 1 depicts a high-level diagram of an embodiment of a system for securely executing an encrypted program.

Having summarized various aspects of the present disclosure, reference will now be made in detail to the description of the disclosure as illustrated in the drawings. While the disclosure will be described in connection with these drawings, there is no intent to limit it to the embodiment or embodiments disclosed herein. On the contrary, the intent is to cover all alternatives, modifications and equivalents included within the spirit and scope of the disclosure as defined by the appended claims.

Embodiments of systems and methods for executing encrypted programs are disclosed. As explained in the background, one apparent shortcoming found in conventional approaches for storing and executing software is that due to the open environment in which computers generally operate, portions of software code can be dissected and analyzed. Consequently, sensitive data such as decryption keys needed to access DVD content may be vulnerable to unauthorized access tampering because in many instances, access to computer memory itself is generally not restricted. With the proper tools, it's possible to suspend software processes to analyze blocks of memory holding these keys to gain access to protected content.

Certain embodiments of systems disclosed herein address these perceived shortcomings by encrypting programs such as multimedia playback software and then forwarding the encrypted program to a secure coprocessor for temporary storage and execution. One embodiment includes a system for securely executing software comprising a host configured to accept a disc containing encrypted content to be accessed and store an encrypted program used to access the content on the disc. The system further comprises a secure coprocessor communicatively coupled to the host and configured to receive the encrypted program, decrypt and execute the encrypted program, and communicate an output generated by the program back to the host.

In some embodiments, either a portion of the program or the entire program is executed on a secure coprocessor. For example, the portion of a playback application which generates keys for decrypting content on an optical disc may be executed on the secure processor. The keys, which constitute the output of the program, may then be communicated back to the host where the content stored on a disc is decrypted and output to a display. In other embodiments, such functions of the playback application including key calculation/generation, decryption, and decoding may be performed entirely by the secure coprocessor. For these embodiments, the generated output may comprise video/audio content sent to a display. To ensure secure transmission of the decoded content, the output may be selectively sent only to devices that are compliant with such DRM standards as HDCP (High-bandwidth Digital Content Protection), which provides for secure transmission of sensitive data over such connections as Digital Visual Interface (DVI) or High-Definition Multimedia Interface (HDMI) connections.

It should be appreciated that for the embodiments discussed herein, the coprocessor includes security features to prevent tampering and unauthorized access. In some embodiments, the processor comprises a processing unit that executes a proprietary instruction set. That is, the instruction set is not one generally known and used by the public. It should be noted, however, that the processing unit is not limited to processors that execute proprietary instruction sets. Finally, the secure coprocessor may include a restricted access RAM that's configured to only interface with the processing unit of the secure coprocessor.

Reference is made to FIG. 1, which depicts a high-level diagram of an embodiment of a system for securely executing an encrypted program. The playback system 100 accepts a disc 150 containing multimedia content. The disc 150 may be any disc containing data and high definition video such as a DVD, HD DVD or Blu-ray disc. Furthermore, the disc may incorporate some type of protection scheme to prevent unauthorized copying and distribution of its title content. For example, Blu-ray Discs and HD DVDs are protected under the DRM specification defined by the AACS LA (Advanced Access Content System License Authority), which provides restricted access for content distribution and is herein incorporated by reference in its entirety. Further information regarding the encryption and decryption of video content may be found on the AACS website: http://www.aacsla.com. While the present disclosure may be applied to other high-density optical disc formats, embodiments described herein will generally apply to discs that incorporate the AACS standard for content distribution.

The content on the disc 150 may be generally categorized into two categories—the main multimedia content itself and volume info relating to the disc. Under the AACS standard, this volume info is referred to as the Media Key Block (MKB). The MKB allows compliant players (i.e., players that have incorporated a license under the AACS LA) to calculate a "secret" key using device keys embedded into the players. One of the objectives of the present invention is to prevent the unauthorized access of these device keys, which are embedded into the software. While the AACS licensing authority may revoke the device key that has been comprised, the AACS licensing authority must actually know which key has been compromised. In many cases, an attacker may simply elect to use the device key rather than publishing the key for others to use.

From a high level, the system 100 may be broken down into two main components: a host 120 and a secure coprocessor 140. The host 120 includes a CPU 122, memory 124, and a decoder block 126 for decoding content that has been decrypted. It should be noted that while the decoder block 126 is shown in the host, the secure coprocessor 140 may also contain a decoder block in other embodiments. Portions of software applications such as HD DVD and Blu-ray Disc software players are encrypted and stored in the memory 124 of the host before being sent to the secure coprocessor for decryption and execution. Such portions of software applications may include the portion of code that handles key generation. These portions of code are executed via the secure coprocessor to ensure security.

The secure coprocessor 140 includes a CPU 142, a decrypter block 144, and a restricted access RAM 146. The CPU 142 may be any central processing unit known by those skilled in the art. Alternatively, the CPU 142 may be a custom processing unit that executes a proprietary instruction set relating to such aspects as data types, instructions, registers, addressing schemes and other aspects known by those skilled in the art. The proprietary instruction set is not known by the general public, making it more difficult to hack into the CPU 142 to perform such unauthorized actions as suspending processes being executed by the CPU 142. The decrypter block 144 decrypts the encrypted program before it is executed and stores the decrypted program into the restricted access RAM 146. To ensure that the decrypted program isn't retrieved from the RAM 146 by unauthorized users, the RAM 146 only allows access by the CPU 142 and is a dedicated resource of the CPU 142. Finally, the host 120 and the secure coprocessor 140 are communicatively coupled such that output generated by the program within the secure coprocessor 140 is sent back to the host 120.

Figure 2:
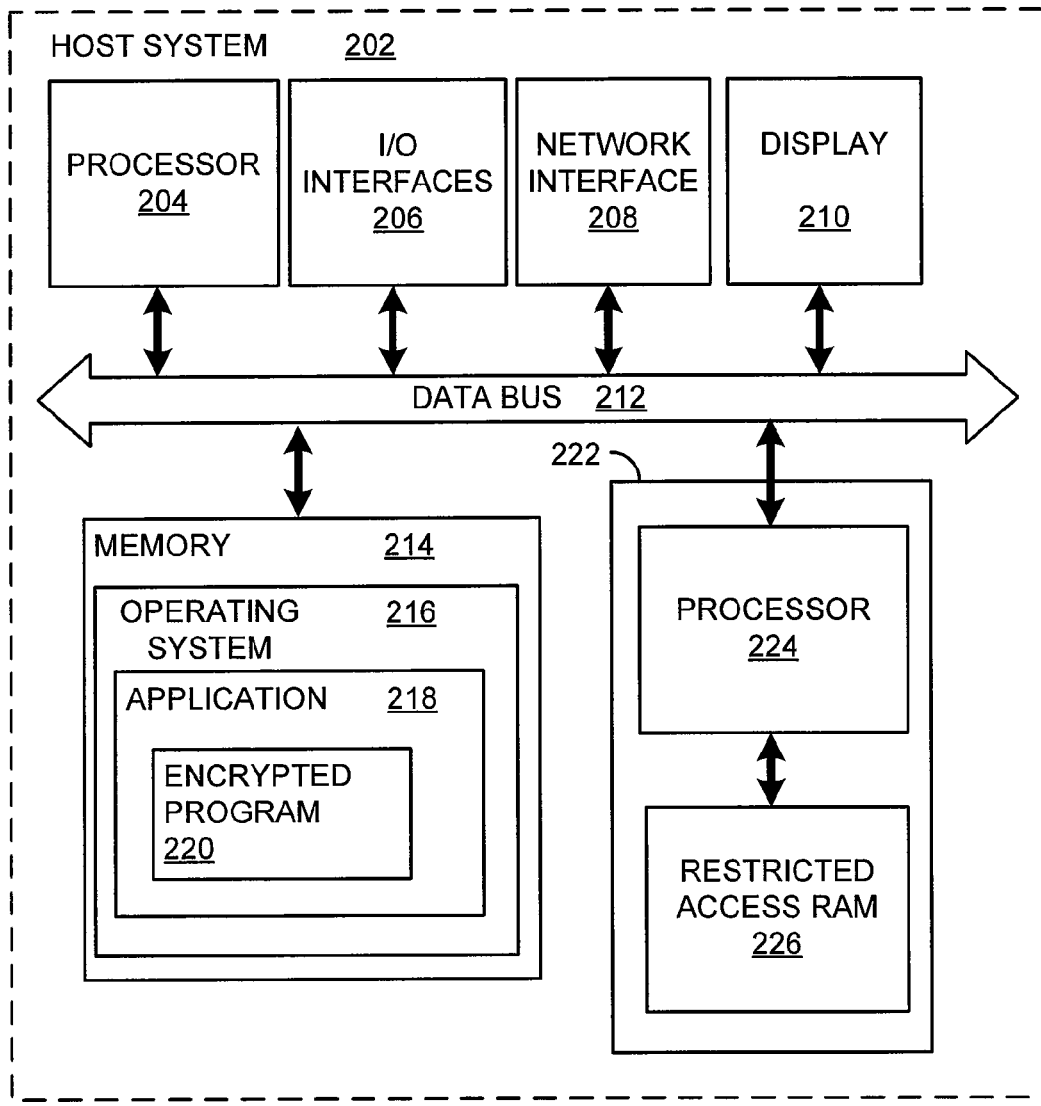
FIG. 2 is a block diagram illustrating an exemplary embodiment of a system for securely executing an encrypted program.

Reference is now made to FIG. 2, which is a block diagram illustrating an exemplary embodiment of a system for securely executing an encrypted program. For some embodiments, the host system 202 may be incorporated into some type of computing device. The secure coprocessor shown in FIG. 1 may either be integrated into the host system 202 or may be a stand alone apparatus. For example, in some embodiments, the host and the secure coprocessor may be both located on the same motherboard of a PC. In other embodiments, however, the secure coprocessor may be located on a separate board such as a graphics card, which may then plug into a slot within the PC. The secure coprocessor then communicates with the host over a bus. To ensure security, the secure coprocessor and the host may incorporate a security measure such as use of an encryption protocol when sending data back and forth.

Generally speaking, the host system 202 may be any one of a wide variety of wired and/or wireless computing devices, such as a desktop computer, portable computer, dedicated server computer, multiprocessor computing device and so forth. Irrespective of its specific arrangement, the host 202 may comprise, among other components, a processor 204, input/output interfaces 206, a network interface 208, and a display 210 connected across a data bus 212. One of ordinary skill in the art will appreciate that the host system 202 can, and typically will, comprise other components, which have been omitted for purposes of brevity. The display 210 can comprise a computer monitor or a plasma screen for a PC or a liquid crystal display (LCD), for example. For added security, the display 210 may be a device that is compliant with any type of DRM scheme such as the HDCP standard, which provides for secure transmission of digital video/audio content over various types of connections.

The processor 204 can include a custom-made or commercially available processor, a central processing unit (CPU) or an auxiliary processor among several processors associated with the host 202, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

The memory 214 can include any one of a combination of volatile memory elements (e.g., random-access memory (RAM, such as DRAM, and SRAM, etc.)) and nonvolatile memory elements (e.g., ROM, hard drive, tape, CDROM, etc.). The memory 214 may store a native operating system 216, one or more native applications, emulation systems, or emulated applications for any of a variety of operating systems and/or emulated hardware platforms, emulated operating systems, etc. For example, the applications may include an application specific program 218 for interfacing with the secure coprocessor 222. Again, one of ordinary skill in the art will appreciate that the memory 214 can, and typically will, comprise other components, which have been omitted for purposes of brevity.

The application 218 shown in FIG. 2 may be a software player application used for playing various disc formats such as HD DVD and Blu-ray discs. When the application 218 is implemented in software, it should be noted that the application can be stored on a variety of computer-readable medium for use by, or in connection with, a variety of computer-related systems or methods. In the context of this document, a computer-readable medium may comprise electronic, magnetic, optical, or other physical device or apparatus that can contain or store a computer program for use by or in connection with a computer-related system or method. The interface can be embedded in a variety of computer-readable medium for use by, or in connection with, an instruction execution system, apparatus, or device, such as a computer-based system, processor-containing system, or other system that can fetch the instructions from the instruction execution system, apparatus, or device and execute the instructions.

In the context of this disclosure, a "computer-readable medium" stores, communicates, propagates, or transports the program for use by or in connection with the instruction execution system, apparatus, or device. The computer readable medium can be, for example, but not limited to, an electronic, magnetic, optical, electromagnetic, infrared, or semiconductor system, apparatus, device, or propagation medium. More specific examples (a non-exhaustive list) of the computer-readable medium may include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical).

Input/output interfaces 206 comprise any number of interfaces for the input and output of data. For example, where the host 202 comprises a personal computer, the components within the system may interface with a user input device such as a keyboard or a mouse. The host 202 may also include a network interface 208 for transmitting and/or receiving data over a network such as encrypted multimedia content. As a non-limiting example, the network interface 208 may include a modulator/demodulator (e.g., a modem), wireless (e.g., radio frequency (RF)) transceiver, a telephonic interface, a bridge, a router, network card, etc.

FIG. 2 illustrates the application 218 comprising an encrypted program 220. The encrypted program 220 may be a portion of the application 216 which contains a device key and which calculates a volume key for decrypting encrypted content stored on a disc. This encrypted program 220 may be sent to the secure coprocessor 222 for secure decryption and execution of the program 220. As noted earlier, the secure coprocessor 224 may be located on a separate board such as a graphics card which plugs into a PC slot in order to communicate with the host system 202. As shown in FIG. 2, the secure coprocessor 222 may interface with the host system 202 via the data bus 212. To ensure secure communications between the secure coprocessor 222 and the host 202, an encryption protocol may be incorporated.

The secure coprocessor 222 includes a processor 224. The processor 224 may comprise a custom-made or commercially available processor, a central processing unit (CPU) or an auxiliary processor among several processors, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system. It should be noted that in some embodiments, the processor 224 may execute a proprietary instruction set in order to reduce the possibility of tampering.

The secure coprocessor 222 further includes restricted access memory 226. The memory 226 may include any one of a combination of volatile memory elements (e.g., random-access memory (RAM, such as DRAM, and SRAM, etc.)) and nonvolatile memory elements (e.g., ROM, hard drive, tape, CDROM, etc.). The restricted access memory 226 stores the program 220 after it has been decrypted. In preferred embodiments, the restricted memory 226 may only be accessed by the processor 224 within the secure coprocessor 222.

Figure 3:
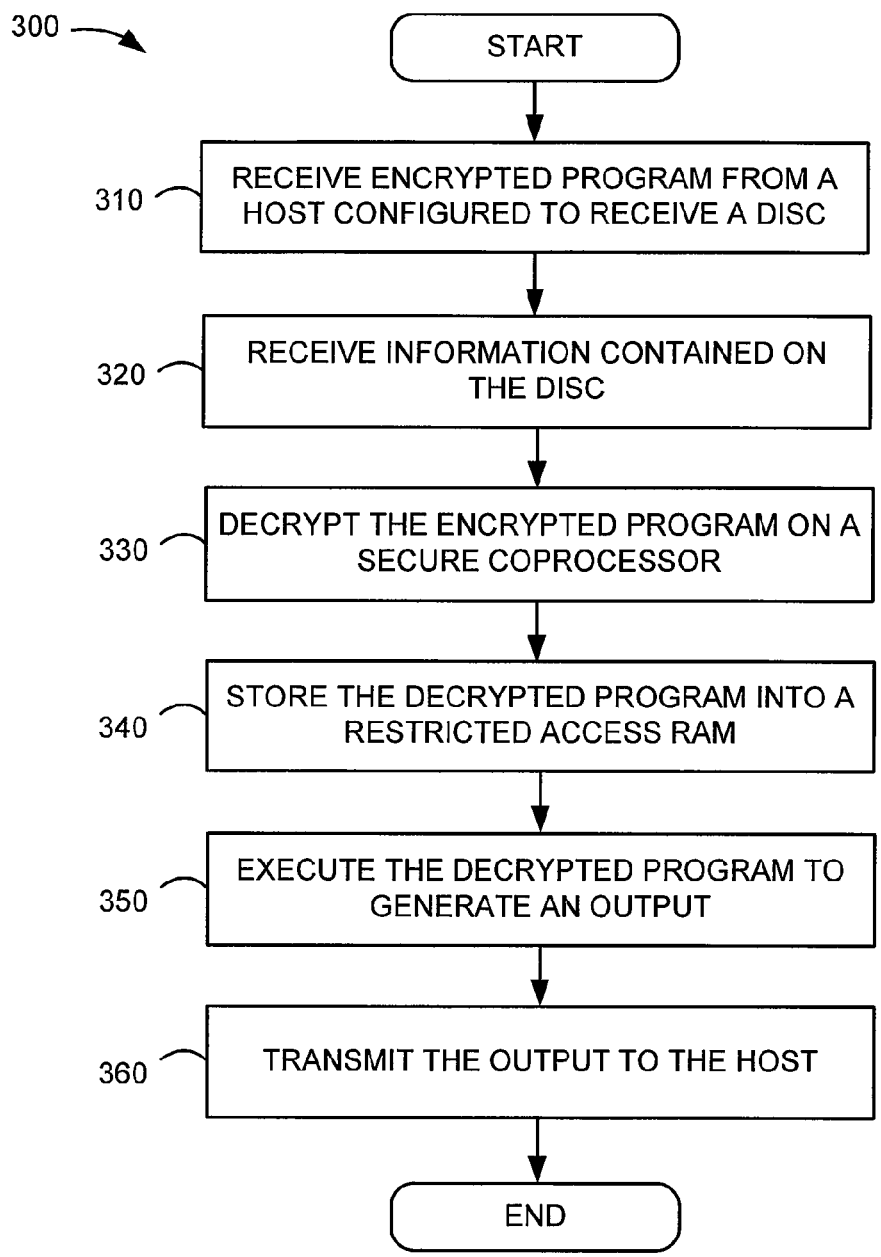
FIG. 3 depicts a top-level flow diagram for an embodiment of a method for securely executing an encrypted program.

Reference is now made to FIG. 3, which depicts a top-level flow diagram for an embodiment of a method for securely executing an encrypted program. In step 310, an encrypted program is received from a host configured to store the encrypted program, wherein the host is further configured to receive a disc storing encrypted content. Next, in step 320, information contained on the disc is received. This information may be later utilized for certain tasks such as calculating keys. In some embodiments, this information may comprise information specific to the disc. In yet other embodiments, the information may further comprise the actual multimedia content (e.g., hi-definition video) stored on the video. In step 330, the encrypted program that was received in step 310 is decrypted on the secure coprocessor. The decrypted program is then stored into the restricted access RAM in step 340 before being executed. The use of the restricted access RAM is one of various security measures implemented to prevent unauthorized access of sensitive information embedded within the program. Next, in step 350, the decrypted program is executed to generate an output. For some embodiments, this output may simply comprise keys calculated during execution of the program. In other embodiments, the output may comprise actual video/audio content stored on the disc. Finally, this output is transmitted back to the host (step 360). The output may comprise keys, which the host utilizes to perform decryption of the title content stored on the disc. One should note that for instances in which the output comprises video/audio content, the content may be output to a device incorporating DRM security measures such as the HDCP standard for secure transmission of digital data.

Figure 4:
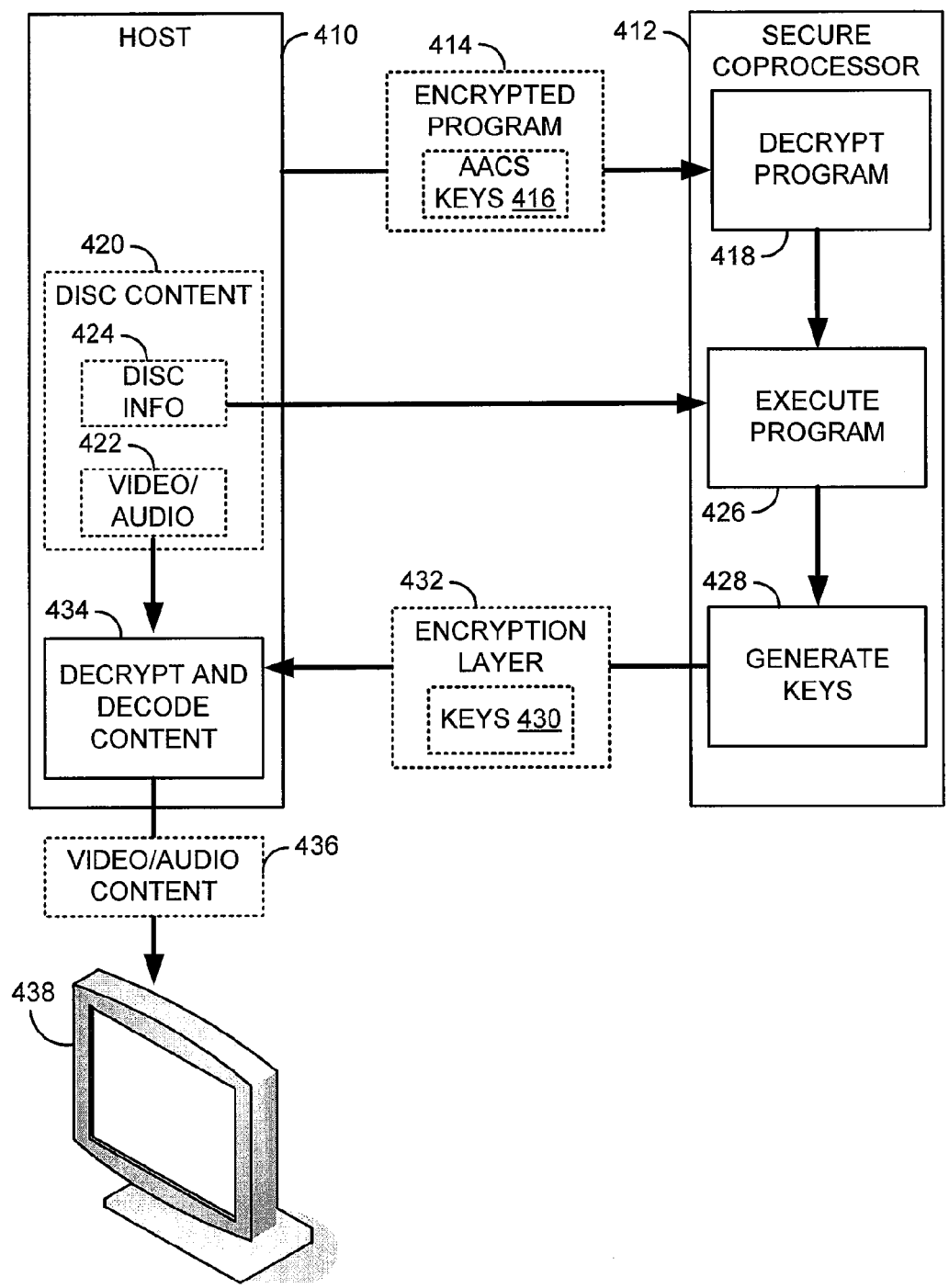
FIG. 4 is a data flow diagram illustrating an embodiment of the system in FIG. 1 performing an alternative embodiment of the method in FIG. 2.
Figure 5:
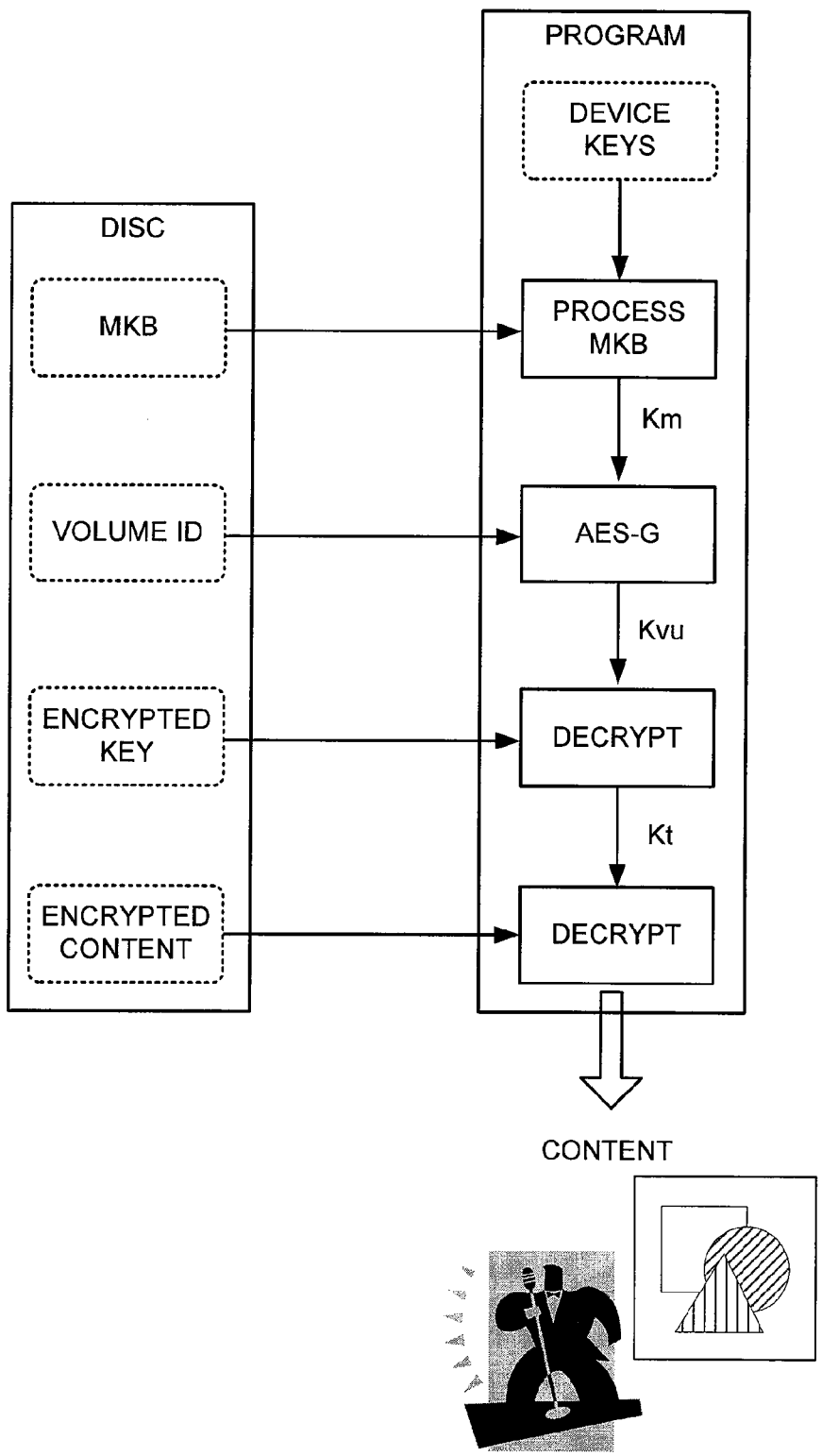
FIG. 5 illustrates a high-level diagram of the AACS protection system.
Figure 6:
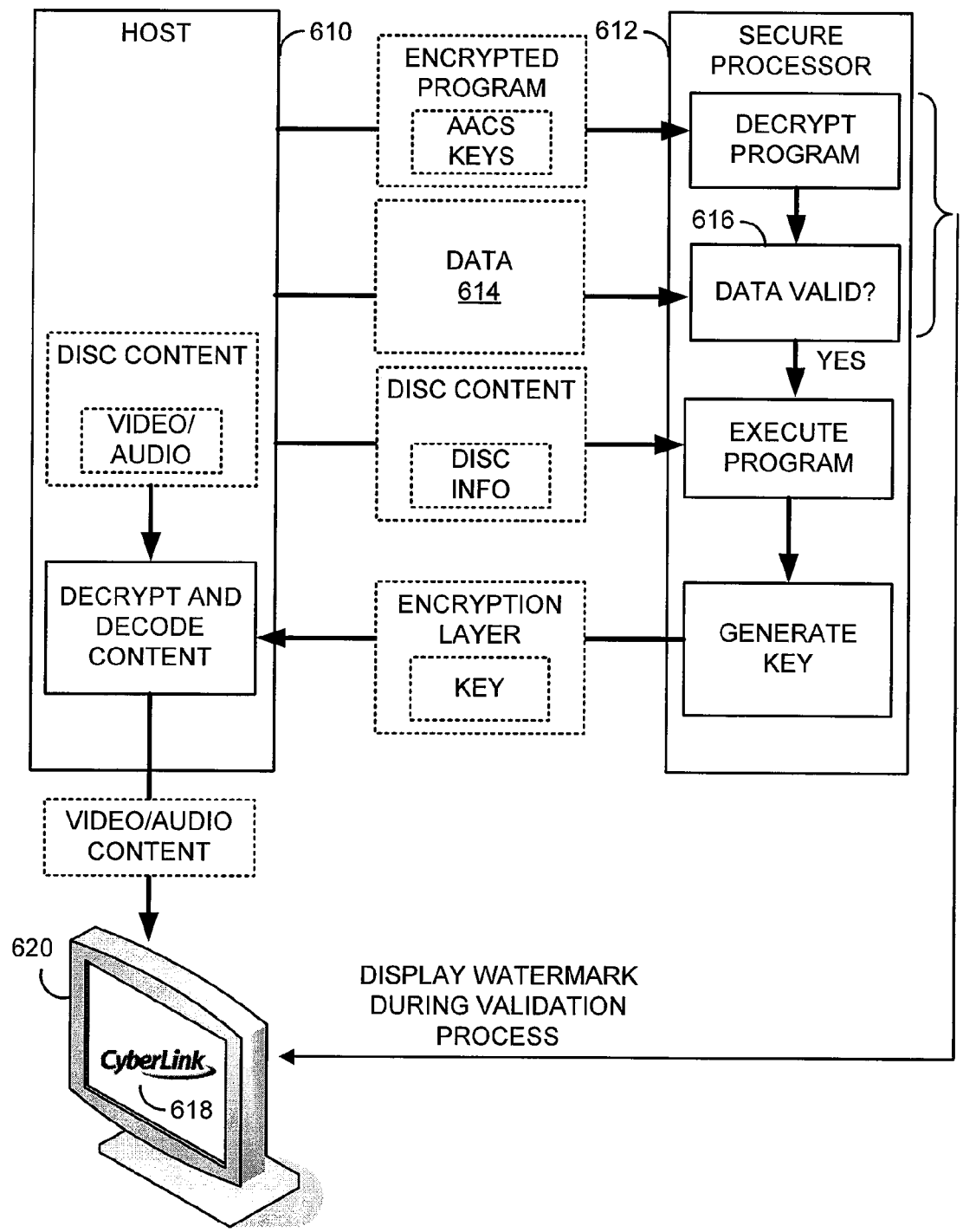
FIG. 6 is a data flow diagram illustrating an embodiment of the system in FIG. 1 performing an alternative embodiment of the method in FIG. 2.

Reference is now made to FIG. 4, which illustrates a detailed data flow diagram illustrating an embodiment of the system in FIG. 1 performing an alternative embodiment of the method in FIG. 2. It should be emphasized that the embodiments to be described in FIGS. 4-6 are merely examples of possible implementations, and that many variations and modifications may be made to these embodiments without departing from the principles of the present disclosure. The host in 410 accepts a disc (e.g., Blu-ray disc, HD DVD, DVD), which contains content to be viewed. The disc content 420 may comprise both disc info 424 and video/audio content 422 such as hi-definition video. An encrypted program 414 stored on the host 410 is forwarded to the secure coprocessor 412 for secure decryption and execution of the program (block 418). In some embodiments, sensitive information such as AACS keys 416 may be embedded into the encrypted program 414. The AACS keys may be keys granted under the AACS licensing authority. It should be emphasized that given the potential for unauthorized distribution of multimedia content, the program 414 carrying the AACS keys 416 is encrypted.

The decryption process may be executed by the processing unit 142 shown in FIG. 1. Upon decryption of the program, the program is stored in the restricted access RAM 146. Prior to executing the program, disc info 424 may be sent to the secure coprocessor 412 to be utilized by the program to generate an output. For some embodiments, the disc info 424 may comprise the MKB defined under the AACS standard. As discussed earlier, the MKB, or Media Key Block, allows compliant players (i.e., programs that have incorporated a license under the AACS LA) to calculate a "secret" key using keys embedded in the program.

Reference is briefly made to FIG. 5, which illustrates a high-level diagram of the AACS protection scheme. AACS scheme encrypts content under one or more title keys using the Advanced Encryption Standard (AES). These title keys are derived from a combination of a media key and other pieces of information, including the volume ID associated with the disc. Even if an unauthorized user tampers with the system and manages to retrieve one of the title keys, this only allows the user to decrypt a portion of the content. While the actual decryption process under the AACS standard falls outside the scope of this disclosure, it should be emphasized that the program which performs the calculation of keys under AACS is fully encrypted and designed to be protected against unauthorized tampering and monitoring.

Referring back to FIG. 4, the program is executed and generates keys (block 428). The keys 430 are then communicated back to the host 410 for decryption of the title content on the disc. As will be described below, the decryption and decoding (block 434) of the content itself may be either performed by the secure coprocessor or the host 410, depending on the implementation. To minimize its complexity, the secure coprocessor 412 may off-load the decryption and decoding of the content to the host 410, which may contain more computing resources. Finally, the content 436 may be output to a display, such as a monitor 438.

FIG. 6 is a data flow diagram illustrating an embodiment of the system in FIG. 1 performing yet another alternative embodiment of the method in FIG. 2. As an added security measure, some embodiments may require an intermediate step to be performed before the program is executed. After the encrypted program is sent to the secure coprocessor 612 for decryption, data 614 may be sent from the host 610 to the secure coprocessor 612, where the data must be validated before the secure coprocessor 612 will execute the decrypted program. For some embodiments, the data 614 may encompass a large amount of predefined data on the order of 100 MB, for example. This serves as a further deterrent for unauthorized users to tamper with the playback system as the users would have to download a large amount of data. Upon receiving the large block of data 614, the secure coprocessor 612 may execute a data validation process 616. As a non-limiting example, the data validation process 616 may simply comprise calculating the checksum of the data 614 and comparing the calculated checksum value with a value stored in the encrypted program. If the two values don't match, the secure coprocessor 612 will not execute the program.

As an added security measure, while the encrypted program is being decrypted and while the large block of data 614 is being received by the secure coprocessor, a watermark 618 such as a CYBERLINK marking may be shown on the display 620 while the processes are executing in the background. This notifies the general public who the owner of the program is in the event that an unauthorized user manages to access and distribute the program.

Figure 7:
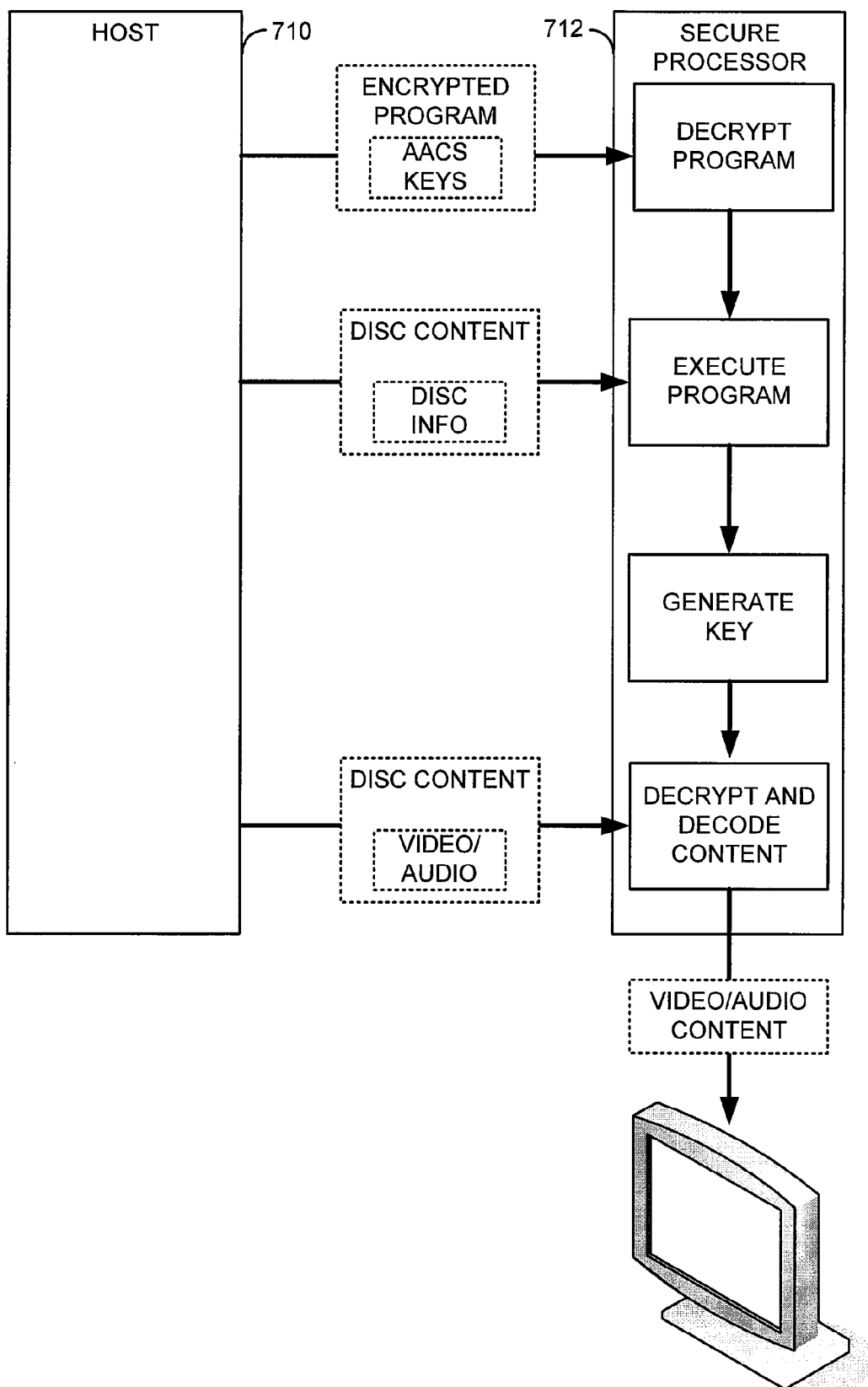
FIG. 7 is a data flow diagram illustrating an embodiment of the system in FIG. 1 performing an alternative embodiment of the method in FIG. 2.

FIG. 7 is a data flow diagram illustrating an embodiment of the system in FIG. 1 performing yet another embodiment of the method in FIG. 2. As briefly discussed above, the decryption and decoding of the content itself may be either performed by the secure coprocessor 712 or the host 710, depending on the desired implementation. To minimize its complexity, the secure coprocessor 712 may off-load the decryption and decoding of the content to the host 710, which may contain more computing resources. In some embodiments, the secure coprocessor 712 may be implemented on a separate board such as a graphics card, which may plug into the host 710. To reduce the cost and the complexity of the design, the decryption and decoding of the content may be performed on the host 710, which may be a PC, for example. However, to maximize security, the final decryption and decoding of the content may also be performed by the secure coprocessor 712 and output directly to a display, such as a monitor. The display may be coupled directly with the secure coprocessor 712 over a secure interface compliant with the HDCP standard, for example. For embodiments in which the decryption and decoding of the content is performed by the host 710, the secure coprocessor 712 may be further configured to monitor the host for unauthorized access.

Other security measures may be implemented into the secure coprocessor as well. For example, the secure coprocessor may include a separate external clock used to monitor execution of the program. In some cases, unauthorized users may attempt to access the protected program by suspending execution of the program in an effort to read data. The separate clock serves as a reference and is used to detect any process suspension in the event that the clock which the program uses during execution is modified in any way.

The secure coprocessor may also implement a memory monitoring feature, which ensures that program code/data is not modified. In the event that unauthorized access is detected, the secure coprocessor may be configured to automatically delete any output (e.g., keys) that have been generated by the program.

Finally, it should again be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

At least the following is claimed:

1. A method for executing encrypted software comprising:
    receiving an encrypted program from a host configured to store the encrypted program, wherein the host corresponds to a first hardware device and is further configured to receive a disc storing encrypted content, and wherein the encrypted program is embedded with a device key;
    receiving information contained on the disc;
    decrypting the encrypted program on a secure coprocessor via a processing unit, wherein the secure coprocessor corresponds to a second hardware device;
    storing the decrypted program into a restricted access RAM, wherein the restricted access RAM is coupled to the processing unit and is accessible only by the processing unit;
    executing the decrypted program stored in the restricted access RAM to generate an output comprising at least one key calculated from the device key;
    transmitting the output to the host; and
    utilizing the key of the output generated by the decrypted program to decrypt the encrypted content stored on the disc.

2. The method of claim 1, wherein generating the output comprises using the device key embedded in the program to calculate the at least one key from the received information contained on the disc.

3. The method of claim 1, wherein generating the output comprises:
    receiving a predetermined amount of data from the host;
    calculating a checksum associated with the received data in order to validate the data; and
    using the device key embedded in the program to calculate the at least one key from the data embedded on the disc only if the data is validated.

4. The method of claim 3, wherein generating the output further comprises displaying a watermark on a display while receiving the predetermined amount of data from the host and while calculating the checksum associated with the received data.

5. The method of claim 1, further comprising
    monitoring the step of using the output to decrypt the encrypted content stored on the disc such that the output is automatically deleted if the step of using the output to decrypt the encrypted content stored on the disc is suspended.

6. A non-transitory computer readable medium having a computer program stored thereon for performing the computer executable method of:
    transmitting an encrypted program from a host configured to store the encrypted program, wherein the host corresponds to a first hardware device and is further configured to receive a disc storing encrypted content, and wherein the encrypted program is embedded with a device key;
    transmitting content contained on the disc;
    decrypting the encrypted program via a processing unit, wherein the processing unit corresponds to a second hardware device;

storing the decrypted program into a restricted access RAM, wherein the restricted access RAM is coupled to the processing unit and is accessible only by the processing unit;

executing the decrypted program stored in the restricted access RAM to generate an output comprising at least one key calculated from the device key;

communicating the output to the host; and utilizing the key of the output generated by the decrypted program to decrypt the encrypted content stored on the disc.

7. A system for securely executing software comprising:

a host configured to accept a disc containing encrypted content to be accessed and store an encrypted program used to access the content on the disc;

a secure coprocessor communicatively coupled to the host and configured to receive the encrypted program, decrypt and execute the encrypted program, and generate an output comprising at least one key used to decrypt the encrypted content stored on the disc, wherein the encrypted program contains a device key used to calculate the at least one key; and wherein the host corresponds to a first hardware device and the secure coprocessor corresponds to a second hardware device.

8. The system of claim 7, wherein the output comprises the content of the disc, wherein the content has been decrypted and decoded by the secure coprocessor.

9. The system of claim 7, wherein the at least one key comprises a volume key sent to the host, and wherein the host uses the volume key to decrypt the encrypted content stored on the disc.

10. The system of claim 9, wherein the secure coprocessor monitors the host decrypting the content stored on the disc such that the secure coprocessor detects if the host is suspended while decrypting the data, wherein upon detection that the host has been suspended, the secure coprocessor erases the output used by the host to decrypt the content.

11. The system of claim 7, wherein the secure coprocessor is comprised of a processing unit and a restricted access RAM coupled to the processing unit, wherein the restricted access RAM is operative to store the decrypted program, and wherein the restricted access RAM is accessible only by the processing unit.

12. The system of claim 11, wherein the processing unit of the secure coprocessor executes a proprietary instruction set.

13. The system of claim 7, wherein the encrypted program incorporates the Advanced Access Content System (AACS) standard for content distribution, and wherein the device key is used by the secure coprocessor to retrieve information from the disc and generate an encrypted volume key, wherein the volume key is used to decrypt the content of the disc.

14. The system of claim 13, wherein the secure coprocessor generates the volume key only if the secure coprocessor detects that the host complies with the High-bandwidth Digital Content Protection (HDCP) standard.

15. The system of claim 7, wherein the secure coprocessor is configured to receive a predetermined amount of data from the host, wherein the program is configured to calculate a checksum associated with the received data in order to validate the data, wherein the encrypted program continues to execute only if the checksum matches a checksum embedded into the encrypted program, and wherein the encrypted program ceases execution if the checksum does not match the checksum embedded into the encrypted program such that access to the content stored on the disc is denied.

16. The system of claim 15, wherein the program is configured to generate a predefined watermark on a display while receiving and validating the predetermined amount of data received from the host.

17. The system of claim 7, wherein the secure coprocessor is further configured to decrypt the encrypted content stored on the disc and transmit the content to a display, wherein transmission of the content is performed according to the HDCP standard.

* * * * *